United States Patent [19]

Lee

[11] Patent Number: 4,918,675
[45] Date of Patent: Apr. 17, 1990

[54] MAGNETO-OPTICAL HEAD WITH SEPARATE OPTICAL PATHS FOR ERROR AND DATA DETECTION

[75] Inventor: Wai-Hon Lee, Cupertino, Calif.

[73] Assignee: Pencom International Corporation, Sunnyvale, Calif.

[21] Appl. No.: 141,459

[22] Filed: Jan. 20, 1988

Related U.S. Application Data

[63] Continuation-in-part of Ser. No. 938,085, Dec. 4, 1986, Pat. No. 4,794,585, which is a continuation-in-part of Ser. No. 860,154, May 6, 1986, Pat. No. 4,731,772.

[51] Int. Cl.$^4$ ................................................ G11B 7/00
[52] U.S. Cl. ........................................ 369/13; 369/112
[58] Field of Search ................ 369/13, 44, 45, 46, 369/109, 110, 122, 112; 250/210 DF

[56] References Cited

U.S. PATENT DOCUMENTS

| | | | |
|---|---|---|---|
| 4,409,631 | 10/1983 | Matsumoto | 369/110 |
| 4,462,095 | 7/1984 | Chen | 369/46 |
| 4,504,939 | 3/1985 | Eberly | 369/46 |
| 4,558,440 | 12/1985 | Tomita | 369/110 |
| 4,599,714 | 7/1986 | Endo | 369/110 |
| 4,670,869 | 6/1987 | Chen | 369/45 |
| 4,672,593 | 6/1987 | Ojima et al. | 369/110 |
| 4,689,481 | 8/1987 | Ono | 369/45 |
| 4,695,992 | 9/1987 | Aoi | 369/44 |
| 4,721,368 | 1/1988 | Deguchi et al. | 369/110 |
| 4,771,411 | 9/1988 | Greve | 369/109 |
| 4,785,438 | 11/1988 | Mizunoe | 369/44 |
| 4,787,076 | 11/1988 | Deguchi et al. | 369/46 |

Primary Examiner—Donald McElheny, Jr.
Attorney, Agent, or Firm—Townsend and Townsend

[57] ABSTRACT

A magneto-optical head using a laser source unit with a focus error and a tracking error detector in substantially the same optical path as the originating laser beam. In this invention the stored information is derived from the beam reflected by a beam-splitter, while the transmitted light is utilized for generating the tracking error and the focus error signals.

8 Claims, 4 Drawing Sheets

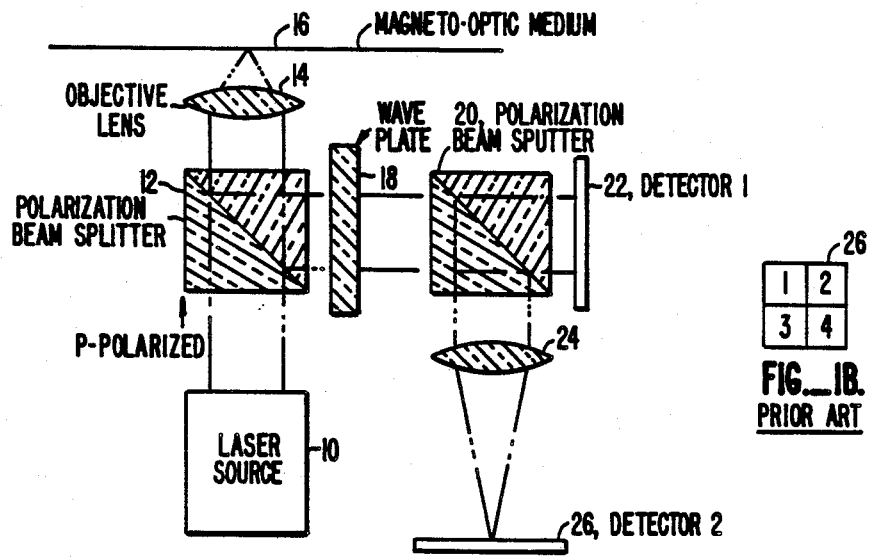
FIG.\_1A. PRIOR ART
FIG.\_1B. PRIOR ART
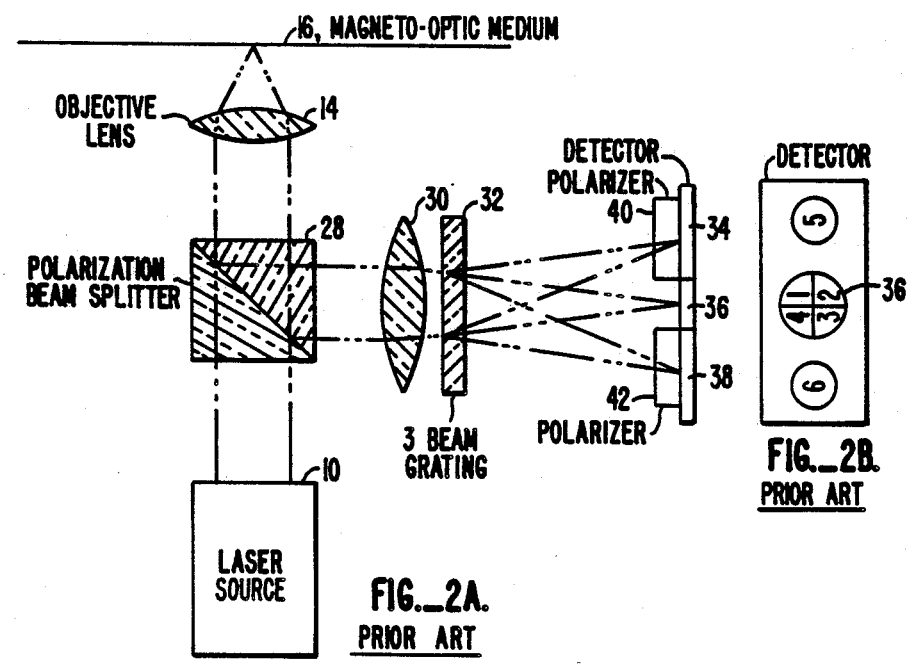
FIG.\_2A. PRIOR ART
FIG.\_2B. PRIOR ART

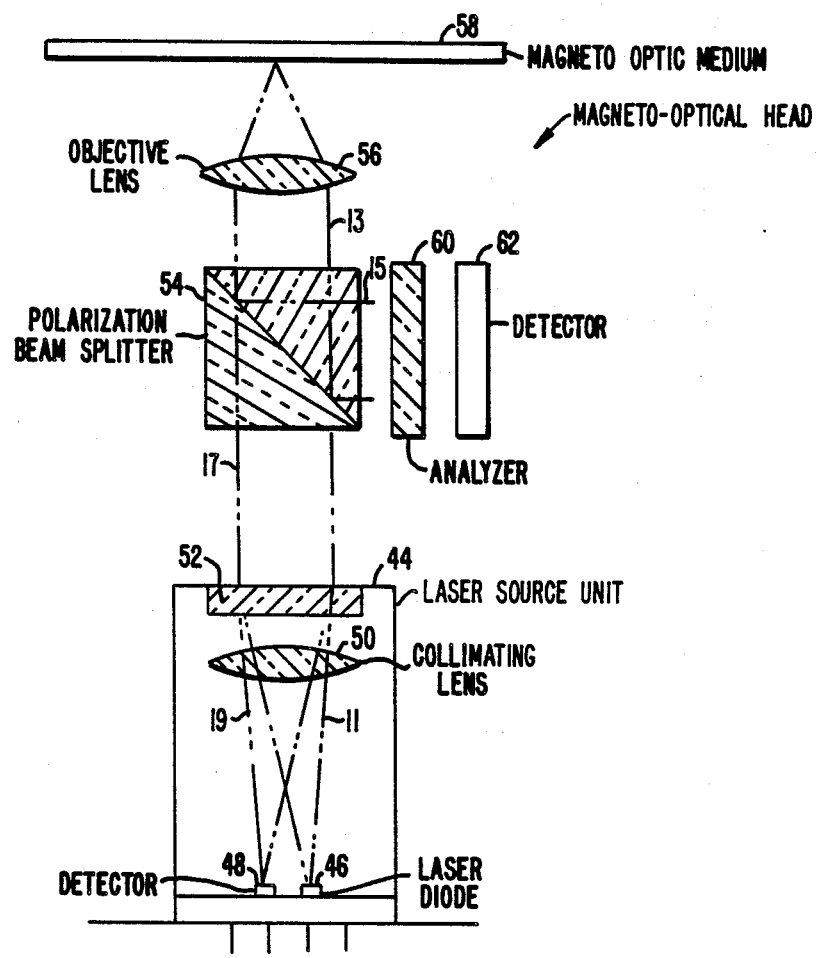
FIG._3.

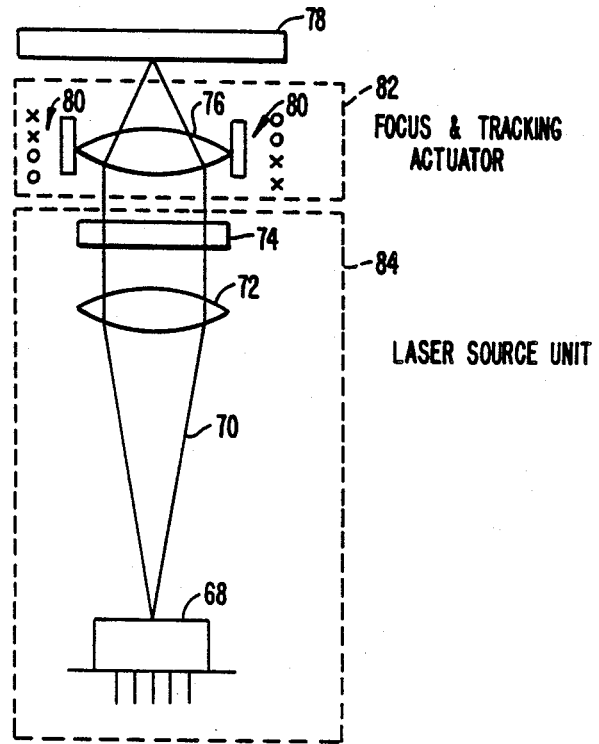
FIG._4.
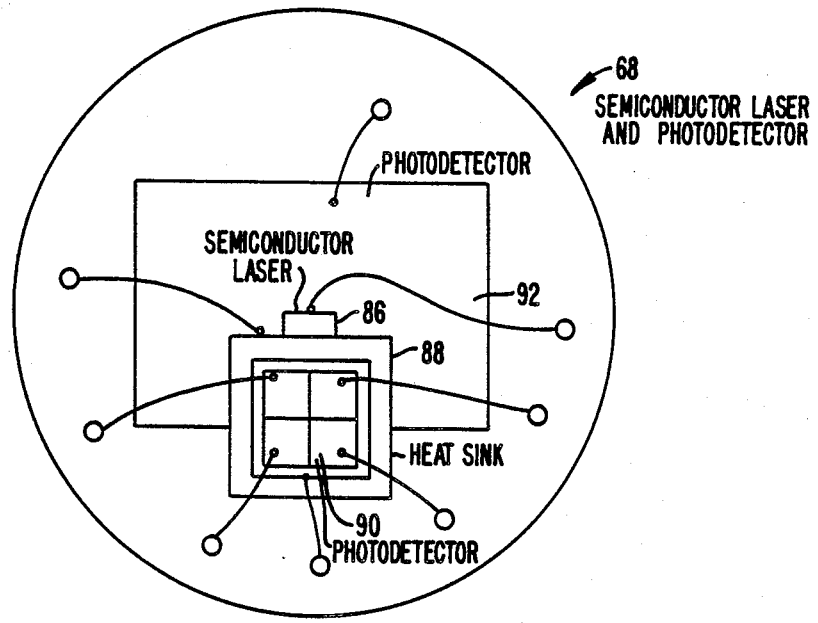
FIG._5.

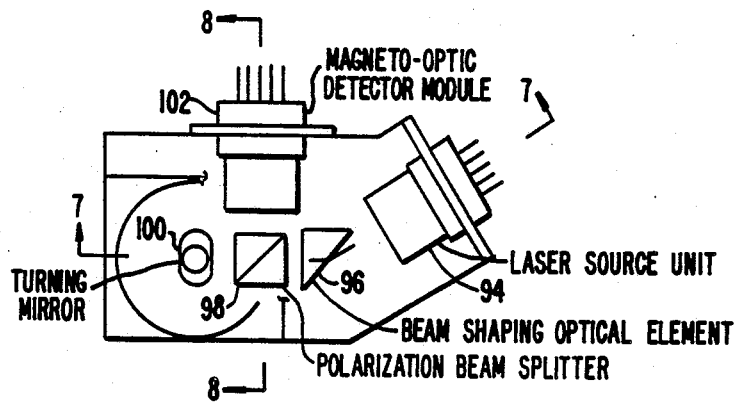
FIG._6.
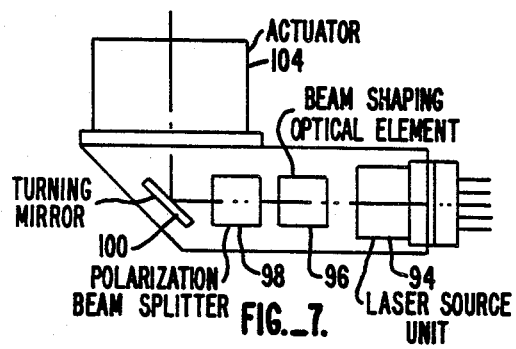
FIG._7.
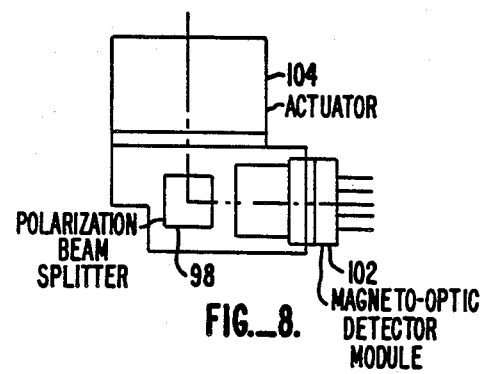
FIG._8.
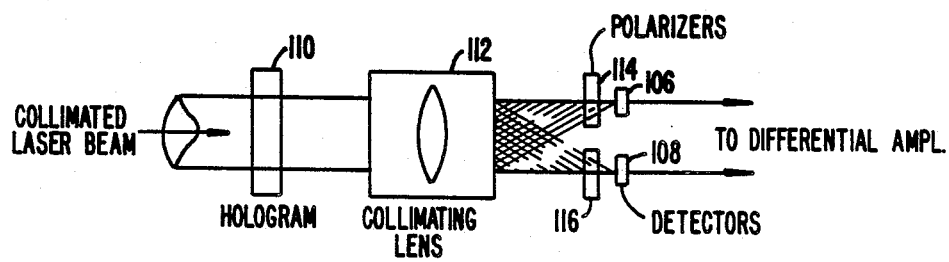
FIG._9.
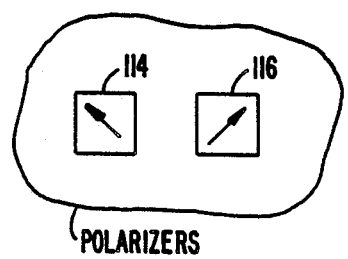
FIG._10.
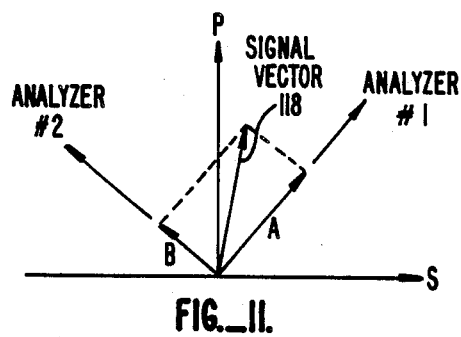
FIG._11.

MAGNETO-OPTICAL HEAD WITH SEPARATE OPTICAL PATHS FOR ERROR AND DATA DETECTION

This is a continuation-in-part of application Ser. No. 938,085 filed Dec. 4, 1986, now U.S. Pat. No. 4,794,585, which is a continuation-in-part of application Ser. No. 860,154 filed May 6, 1986, now U.S. Pat. No. 4,731,772.

BACKGROUND

The present invention relates to magneto-optical heads for use in data recording and retrieval systems.

Thermal magnetic recording provides an erasing and rewriting capability. The principle of thermal magnetic recording is based on a characteristic of certain ferromagnetic materials. When the temperature of the material is raised above the Currie temperature, the magnetization of the material can be affected by a small magnetic field. This principle is used for thermal magneto-optics data storage where a laser beam is focused on the recording medium to raise the temperature of the medium above the Currie temperature. A small electromagnet is placed on the other side of the medium to create a magnetic field near the medium to change the magnetization of the medium. To retrieve information from the medium a laser beam is again focused on the medium but at lower power. Depending on the magnetization of the medium, the polarization of the beam reflected off the medium is either unchanged or rotated by about 0.4 degree. An analyzer (polarizer) inserted before a photodetector allows the detector to sense these two different states of polarization of the returned beam. One method of erasing the recorded information is to first reverse the direction of magnetization of the electro-magnet and then apply a focused laser beam to raise the temperature of the medium to above the Currie temperature to uniformlY magnetize the medium in one direction.

To use the above principle in optical data storage systems an optical head is needed to produce a focused laser beam on the thermal magnetic medium. Moreover, a polarizer is needed to permit the detector to read the information recorded on the medium.

Polarizers needed for the thermal magnetic optical heads are available commercially in two forms. One is a sheet type polarizer based on dichroism, which is the selective absorption of one plane of polarization in preference to the other orthogonal polarization during transmission through a material. Sheet polarizers are manufactured from organic materials which have been imbedded into a plastic sheet. The sheet is stretched, thereby aligning the molecules and causing them to be birefringent, and then dyed with a pigment. The dye molecules selectively attach themselves to the aligned polymer molecules, with the result that absorption is very high in one plane and relatively weak in the other. The transmitted light is then linearly polarized. The optical quality of the sheet type polarizers is rather low. They are used mostly for low power and visual applications.

Another type of polarizer is based on the use of wire grid structures to separate the two orthogonal polarizations. When light radiation is incident on an array of parallel reflective stripes whose spacing is on the order of or less than the wavelength of the radiation, the radiation whose electric vector is perpendicular to the direction of the array is reflected. The result is that the transmitted radiation is largely linearly polarized. The disadvantage of both types of polarizers is that their light efficiencies are typically less than 30%.

A typical optical head for magneto-optic detection is shown in FIG. 1A. A laser is distinguished from ordinary light in that it has a preferred orientation. P-polarized means the orientation is parallel to the paper in FIG. 1A, s-polarized means that the orientation is perpendicular to the paper. Thus, the s and p components are orthogonal. In FIG. 1A a laser source 10 projects a collimated beam through a beam-splitter 12 to an objective lens 14 which focuses the beam on a magneto-optic medium 16. The properties of beam-splitter 12 are that it will pass 80% of the p-polarized light and reflect 100% of the s-polarized light. With the laser diode p-polarized with respect to the beam-splitter, 80% of the light is transmitted to the medium through the objective lens. The remaining 20% is reflected by the beam-splitter and is lost.

When the laser beam is focused on the surface of the medium, the heat generated raises the material to a temperature at which the orientation of the magnetic domain in the recording medium can be reversed by a small external magnetic field. Consequently, information can be recorded by pulsing the laser diode in accordance with the data sequence.

Recorded information can be retrieved by focusing again a low power laser beam at the media. The interaction of the localized magnetic domain orientation with the light beam causes the polarization of the reflected beam to be rotated by a small angle. In other words, the p-polarized light beam, after interacting with the medium, now contains a small s-polarized component. The light vector's direction of rotation depends on the orientation of the magnetic domain on the medium. Thus, the s-component value is either positive or negative, corresponding to $+1$ or $-1$. For digital numbers, the $-1$ corresponds to a digital 0.

When the reflected beam re-enters beam-splitter 12, 100% of the s-polarized component is reflected and only 20% of the p-polarized component is reflected. The 80% of the p-polarized component in the reflected beam is transmitted through beam-splitter 12 and toward the laser diode and is not used. Since both the p and s components are needed by the detectors, part of either the p or s component must be lost since both cannot be split off by a beam-splitter. The p component is chosen to be reduced to increase the value of the small s component relative to the p component. The polarization orientation of the beam reflected by beam-splitter 12 is further rotated by 45 degrees by waveplate 18 before passing through beam-splitter 20 to further increase the value of the s-component relative to the p-component. Beam-splitter 20 has the properties that 100% of the s-polarized component is reflected and 100% of the p-polarized component is transmitted. The direction of rotation of the returned beam can be detected by taking the difference between the light detected by detector 22 and detector 26. Of course, detector 26 has four detectors so that it can perform tracking error and focus error detection in the normal manner for optical heads.

A second possible embodiment is shown in FIG. 2A. A laser source 10, objective lens 14 and magneto-optic media 16 are provided as in FIG. 1A. Beamsplitter 28 has the same properties as beam-splitter 12 in FIG. 1A. As the returned light is reflected by beam-splitter 28, the light is focused by lens 30 through a grating 32 to detectors 34, 36 and 38. Diffraction grating 32, which is preferably produced by holographic methods, is used in place of a beam-splitter and provides three diffracted beams to detectors 34, 36, and 38. Polarizers 40 and 42 in front of detectors 34 and 38, respectively, enable the detection of the direction of rotation of the polarization of the returned beam. As can be seen from FIG. 2B, detectors 34 and 38 are single detectors while detector 36 is a four-quadrant detector for focus and tracking error detection.

SUMMARY OF THE INVENTION

The present invention is an improved magneto-optical head using a laser source unit with a focus error and tracking error detector disposed in substantially the same optical path as the originating laser beam. In this invention the stored information is derived from the beam reflected by a beam-splitter, while the transmitted light is utilized for generating the tracking error and the focus error signals.

In the prior art devices the stored information as well as the servo electronic signals are derived from the small amount of the light beam reflected by beam-splitter 12 or beam-splitter 28 in FIG. 1A and FIG. 2A. This invention has the further advantage that the beam-splitter can either be the 80/20 type similar to the prior art devices or a beam-splitter which transmits substantially all of the p-polarized component while reflecting substantially all the s-polarized component. This improves the light throughput from the laser diode to the medium of the device. Moreover, such a beam-splitter for transmitting all the p-polarized and reflecting all of the s-polarized light is more commonly available and less expensive.

The unique laser source unit of the present invention allows a much smaller optical head to be used with a reduced number of parts. The laser source unit includes a laser diode for producing a laser beam to impinge upon the objective lens. On the return path, the laser beam impacts a diffraction grating, which may be holographic, between the laser and the objective lens. The diffracted beams on the forward path from the laser to the objective lens are not used, but on the return path, one of the diffracted beams is focused onto a photodetector immediately adjacent the laser diode.

For a fuller understanding of the nature and advantages of the invention, reference should be made to the ensuing detailed description taken in conjunction with the accompanying drawings.

BRIEF DESCRIPTION OF THE DRAWINGS

FIG. 1A is a block diagram of a prior art magneto-optic head;

FIG. 1B is a diagram of the focus and tracking detector of FiG. 1A;

FIG. 2A is a block diagram of a second prior art magneto-optic head using a three beam diffraction grating;

FIG. 2B is a diagram of the photodetectors of FIG. 2A;

FIG. 3 is a block diagram of a magneto-optic head according to the present invention;

FIG. 4 is a diagram of a preferred embodiment of an optical head according to the present invention having a laser diode and a photodetector immediately next to each other;

FIG. 5 is a front plan view of the semiconductor laser and photodetector of FIG. 4;

FIG. 6 is a diagram of a second embodiment of a magneto-optic head according to the present invention;

FIG. 7 is a sectional view of the embodiment of FIG. 6 along lines 7—7;

FIG. 8 is a sectional view of the embodiment of FIG. 6 along lines 8—8;

FIG. 9 is a diagram of one embodiment of the magneto-optic detector of FIG. 6 using two detectors;

FIG. 10 is a diagram illustrating the different polarizations of the polarizers of FIG. 9; and FIG. 11 is a diagram of the signal vector detected by the detectors of FIG. 9.

DETAILED DESCRIPTION OF THE PREFERRED EMBODIMENTS

FIG. 3 is a block diagram of the magneto-optical head according to the present invention. A laser source unit 44 includes a laser diode 46 and an adjacent photodetector 48, along with a collimating lens 50 and a holographic optical element 52. The laser diode is arranged to have polarization parallel to the plane of incidence of a beam-splitter 54 (i.e., the laser beam 11 is p-polarized with respect to the beam-splitter). Beam-splitter 54 has the property that it transmits substantially all of p-polarized light 17 and reflects substantially all of s-polarized light 15. Therefore, all of the p-polarized collimated light 11 from the laser diode is transmitted by beam-splitter 54 to an objective lens 56 for focusing onto a magneto-optic medium 58 for the purpose of writing or reading from the medium.

In retrieving information from the medium, the interaction of the localized magnetic domain orientation with the light beam 11 causes the polarization of the reflected beam 13 to be rotated by a small angle. In other words, the p-polarized light beam 11, after interacting with the medium, now contains a small s-polarized component 15. The light vector's direction of rotation depends on the orientation of the magnetic domain on the medium. When this reflected beam 13 reenters beam-splitter 54, 100% of the small s-polarized component 15 is reflected and an equally small amount of p-polarized component is reflected due to the imperfection of beam-splitter 54. As a result, the polarization orientation of the light beam 11 after reflection by beam-splitter 54 undergoes a large rotation. The direction of rotation can easily be analyzed by using an analyzer (polarizer) 60 and a photodetector 62.

Most of the p-polarized component 17 of the light 13 reflected off the medium is returned to the laser source unit and is diffracted by holographic optical element 52 which produces a diffracted beam 19 for detecting the focus error and tracking error signals within the laser source unit. This embodiment of the present invention thus allows a simpler beam-splitter than the 80/20 beam-splitter of the prior art to be used. The extra polarization beam-splitter of the embodiment of FIG. 1A is eliminated. The present invention provides better signal-to-noise ratio, because the light 15 reflected by beam-splitter 54 is used solely for recovering the stored information and none of this light 15 is subdivided for sensing the servo errors.

The laser source unit of FIG. 3 is shown in FIG. 4. This optical head arrangement can be used for different recording mediums, such as a thermal-magnetic medium or a medium using lands and pits. A semiconductor laser and detector 68 radiates a laser beam 70 to a collimating lens 72. The collimated beam passes through a hologram lens 74 to an objective lens 76.

Hologram lens 74 can also be put between semiconductor laser and detector 68 and the collimating lens 72. Objective lens 76 focuses the beam onto a medium 78. Objective lens 76 can be moved by a coil 80 in a focusing and tracking actuator 82. Semiconductor laser and detector 68, collimating lens 72 and hologram lens 74 form a laser source unit 84 portion of the optical head.

FIG. 5 shows a front view of the semiconductor laser and photodetector 68. A semiconductor laser 86 is mounted on a heat sink 88. A four-quadrant photodetector 90 is mounted on the face of heat sink 88. A photodetector 92 is located behind semiconductor laser 86 to measure the light emitted from the semiconductor laser. Photodetector 92 is at an angle so that it does not reflect light back into semiconductor laser 86. Four-quadrant detector 90 is preferably within 5 millimeters of semiconductor laser 86 and is preferably within 2 mm of the same plane as laser 86. A typical manufacturing process results in a photodetector with a thickness of 0.25 to 0.5 mm, and thus a separation of this amount between the photodetector surface and the laser diode face. This separation can be compensated for with a hologram lens combining an astigmatic wavefront for focus error generation and a spherical wavefront similar to a conventional lens. This should place the detector within the focus error range of the optical head. A more detailed description of a preferred embodiment of semiconductor laser and photodetector 68 is presented in copending application Ser. No. 858,411, filed May 1, 1986.

In operation, laser beam 70 from semiconductor laser 86 is collimated or made parallel by collimating lens 72. This collimated beam passes through hologram lens 74 to produce a zero order diffracted beam and a number of higher order diffracted beams. The zero order diffracted beam is the one which continues on the same path, and not at an angle, and is the only beam used in the forward light path of the optical head. This beam is focused on medium 78 by objective lens 76 which can be moved with coil 80.

On the return path, the beam again hits hologram lens 74 producing zero and higher order diffracted beams. The zero order beam is returned to the laser and is not used for detection. (Some prior art systems utilize the change in power of the laser due to the reflected beam to measure the intensity of the reflected beam. These systems, however, cannot do focusing and tracking in this manner.) The reflected beam on the return path also produces higher order diffracted beams from holographic lens 74. One of these higher order diffracted beams is imaged onto photodetector 90. Preferably, this is the first order diffracted beam which is diffracted by an angle of approximately 10 degrees. This structure has the advantage of having the semiconductor laser and photodetector mounted on the same mechanical structure. Thus, motion of this mechanical unit has little effect on the signals received by the optical head because the detector will move in the same amount and direction as th beam will move due to movement of the semiconductor laser.

The embodiment of FIG. 4 is modular in that laser source unit 84 can be replaced separately from focusing and tracking actuator 82. In fact, the focusing and tracking actuator of FIG. 4 is the same as the focusing and tracking actuator of the prior art.

In addition to diffracting the beam of light to move it slightly so that it will impinge upon the photodetector, hologram lens 74 can also be constructed to perform a tracking and focusing function in conjunction with the photodetector. Such a system is described in parent application Ser. No. 938,085.

FIG. 6 is a top, sectional view of an alternate embodiment of the present invention. Again, the distinction of this embodiment from the prior art is the separate detection of the stored information and the servo error signals. Moreover, the use of another holographic beam-splitter in this embodiment allows the sensing of the polarization rotation of the returned beam by a differential detection method. As can be seen in FIG. 6, a laser source unit 94 directs a p-polarized laser beam through a beam shaping optical element 96 to a 80/20 polarization beam-splitter 98. From there, the beam is directed to a turning mirror 100 which directs the beam out of the page to an actuator not shown for projection onto the magneto-optic media. On the return path, turning mirror 100 directs the light back to beam-splitter 98. The 80% of the p-polarized component is passed through beam-splitter 98 and returned to laser pen 94 for producing the servo error signals. The s-component generated by the opto-magnetic interaction and 20% of the p-component is directed to a magneto-optic detector module 102.

FIG. 7 is a sectional view along lines 7—7 of FIG. 6 showing the path of the P- component of the laser beam from actuator 104, through mirror 100, through polarization beam-splitter 98, through optical element 96 to the photodetector in laser pen 94. FIG. 7 shows the connection of the actuator 104 which includes the objective lens and the mechanisms for moving the objective lens.

FIG. 8 is a sectional view along lines 8—8 of FIG. 6 showing the path of the S- component from actuator 104 through mirror 100 (not shown) and polarization beam-splitter 98 to magneto-optic detector 102.

FIG. 9 shows one embodiment of magneto-optic detector 102 of FIG. 6. The FIG. 9 implementation allows the use of an 80/20 beam-splitter where desired. This embodiment uses two photodetectors 106, 108 since both P and S components are transmitted, as contrasted with the single photodetector of the embodiment of FIG. 3. The laser beam passes through a hologram lens 110 which produces two diffracted beams for impacting photodetectors 106 and 108 after passing through collimating lens 112. Polarizers 114 and 116 are placed in front of photodetectors 106 and 108, respectively.

As shown in FIG. 10, polarizers 114 and 116 pass components of the laser beam which have orthogonal polarization components.

As shown in FIG. 11, a signal vector 118 may be slightly rotated relevant to the P- axis. Vector 118 will have components A and B. As can be seen, if analyzers 114 and 116 pass components in the direction of components A and B, the photodetectors will detect different amplitude signals. Note that it may not be possible to exactly align the analyzers for the P or S component or for the components of the 0.4 degree expected rotation vector. However, such precise alignment is not necessary. Therefore, the difference between the values of the photodetectors provides the detected signal, which is 1 if component A is greater than B and is −1 if component A is less than B.

As will be understood by those familiar with the art, the present invention may be embodied in other specific forms without departing from the spirit or essential characteristics thereof. For example, the polarizers of FIG. 9 need not be orthogonal. In addition, one of the photodetectors could be positioned to detect the 0 order (on axis) diffracted beam from hologram lens 110. Accordingly, the disclosure of the preferred embodiment of the invention is intended to be illustrative, but not limiting, of the scope of invention which is set forth in the following claims.

What is claimed is:

1. A magneto-optical head for reading information recorded on a reflective medium, comprising:
   a laser source unit (44) for directing a laser beam (11) having a first polarization as it leaves said laser source unit to said medium (58);
   a polarization beam-splitter (54), mounted between said laser source unit and said medium, for deflecting substantially all of a first component (15) of a reflected beam (13) of said laser beam off said medium, said first component having a second polarization orthogonal to said first polarization;
   first photodetector means (62) for detecting said first component deflected off said polarization beam-splitter;
   second photodetector means (48) mounted in said laser source unit; and
   a first diffraction grating (52), coupled to said laser source unit, for producing a diffracted beam (19) from a non-deflected portion (17) of said reflected beam for tracking error and focus error detection within said laser source unit.

2. The magneto-optical head of claim 1 wherein said polarization beam-splitter transmits to said first diffraction grating substantially all of a second component of said reflected beam, said second component having said first polarization.

3. The magneto-optical head of claim 1 further comprising a first analyzer, mounted between said polarization beam-splitter and said first photodetector means, for transmitting said first component deflected off said polarization beam-splitter.

4. The magneto-optical head of claim 3 wherein said polarization beam-splitter deflects a portion of a second component of said reflected beam, said second component having said first polarization, the magneto-optical head further comprising:
   a second diffraction grating mounted between said polarization beam-splitter and said first analyzer to receive said components deflected off said polarization beam-splitter and produce a plurality of diffracted beams;
   third photodetector means mounted to intercept one of said diffracted beams; and
   a second analyzer, mounted between said second diffraction grating and said third photodetector means, for transmitting said portion of said second component deflected off said polarization beam-splitter.

5. A magneto-optical head for reading information recorded on a reflective medium, comprising:
   a laser source unit for directing a laser beam having a first polarization as it leaves said laser source unit to said medium;
   a first photodetector mounted in said laser source unit;
   a first diffraction grating, coupled to said laser source unit, for producing a diffracted beam from a non-deflected portion of a reflected beam of said laser beam off said medium for tracking error and focus error detection within said laser source unit;
   a polarization beam-splitter, mounted between said laser source unit and said medium, for deflecting a substantial portion of a first component of said reflected beam, for transmitting to said first diffraction grating a substantial portion of a second component of said reflected beam, and for deflecting a portion of said second component of said reflected beam, said first component having a polarization orthogonal to said first polarization, said second component having said first polarization;
   a second diffraction grating for producing a plurality of diffracted beams from said components deflected off said polarization beam-splitter;
   second and third photodetectors for detecting beams diffracted from said second diffraction grating;
   a first polarizer, mounted between said second diffraction grating and said second photodetector, for transmitting light of a second polarization oriented approximately 45° with respect to said first polarization; and
   a second polarizer, mounted between said second diffraction grating and said third photodetector, for transmitting light of a third polarization oriented approximately 90° with respect to said second polarization.

6. A magneto-optical head for reading information recorded on a reflective medium, comprising:
   semiconductor laser source for radiating a laser beam having a first polarization;
   a diffraction grating disposed between said laser source and said medium to produce a diffracted beam from a reflected beam of said laser beam off said medium, said diffracted beam having an optical axis inclined relative to an optical axis of said reflected beam, said diffraction grating being patterned to produce a spacial variation in said diffracted beam responsive to variations in the focus of said laser beam on said medium;
   first photodetector means, positioned to intercept said diffracted beam, for detecting said spacial variation in said diffracted beam;
   a polarization beam-splitter, mounted between said diffraction grating and said medium, for deflecting substantially all of a first component of said reflected beam, said first component having a second polarization orthogonal to said first polarization; and
   second photodetector means for detecting said first component deflected off said polarization beam-splitter.

7. The magneto-optical head of claim 6 wherein said polarization beam-splitter transmits to said diffraction grating substantially all of a second component of said reflected beam, said second component having said first polarization.

8. The magneto-optical head of claim 6 further comprising an analyzer, mounted between said polarization beam-splitter and said second photodetector means, for transmitting said first component deflected off said polarization beam-splitter.

* * * * *